US011644167B2

(12) United States Patent
Darlage et al.

(10) Patent No.: US 11,644,167 B2
(45) Date of Patent: May 9, 2023

(54) LOW PROFILE LIGHT WITH AN OVERSIZED LIGHT EMISSION

(71) Applicant: Valeo North America, Inc., Troy, MI (US)

(72) Inventors: Colby Darlage, Auburn Hills, MI (US); Brant Potter, Seymour, IN (US); Damien Cabanne, Auburn Hills, MI (US); Drew Haywood, Auburn Hills, MI (US); Jean Sebastien Delfosse, Auburn Hills, MI (US); Gaurav Bhutani, Auburn Hills, MI (US)

(73) Assignee: Valeo North America, Inc., Troy, MI (US)

( * ) Notice: Subject to any disclaimer, the term of this patent is extended or adjusted under 35 U.S.C. 154(b) by 0 days.

(21) Appl. No.: 17/462,609

(22) Filed: Aug. 31, 2021

(65) Prior Publication Data

US 2023/0062314 A1 Mar. 2, 2023

(51) Int. Cl.

| | |
|---|---|
| ***B60Q 1/04*** | (2006.01) |
| ***F21S 41/25*** | (2018.01) |
| ***F21S 41/37*** | (2018.01) |
| ***F21S 41/33*** | (2018.01) |
| *F21S 41/24* | (2018.01) |

(52) U.S. Cl.

CPC ............ *F21S 41/25* (2018.01); *F21S 41/336* (2018.01); *F21S 41/37* (2018.01); *F21S 41/24* (2018.01)

(58) Field of Classification Search

None

See application file for complete search history.

(56) References Cited

U.S. PATENT DOCUMENTS

| | | | | |
|---|---|---|---|---|
| 2006/0285348 | A1* | 12/2006 | Valcamp | F21S 43/14<br>362/240 |
| 2017/0089541 | A1 | 3/2017 | Nakajima et al. | |
| 2018/0163939 | A1* | 6/2018 | Chen | F21S 41/36 |
| 2019/0064423 | A1* | 2/2019 | McCarter | G02B 6/001 |
| 2019/0195462 | A1* | 6/2019 | Hong | F21S 43/10 |

FOREIGN PATENT DOCUMENTS

| | | | |
|---|---|---|---|
| EP | 3059120 | A1 | 8/2016 |
| EP | 3211295 | A1 | 8/2017 |
| JP | 2005056623 | A | 3/2005 |
| JP | 2016058347 | A | 4/2016 |

OTHER PUBLICATIONS

International Search Report and Written Opinion for Application No. PCT/US2022/040712, dated Nov. 7, 2022, 11 pgs.

* cited by examiner

*Primary Examiner* — Elmito Breval
(74) *Attorney, Agent, or Firm* — Young Basile Hanlon & MacFarlane, P.C.

(57) ABSTRACT

A light system comprising: (a) one or more bezels; (b) an internal lens located within and in communication with the one or more bezels, wherein the internal lens has a height; and (c) a light source that directs light from the light system to a location outside of a vehicle that is configured to house the light system, wherein some of the light is directed to the location outside of the vehicle directly through the internal lens; wherein the one or more bezels include a reflector surface located outside of the height of the internal lens and some of the light from the light source is redirected by the internal lens to the reflector surface of the one or more bezels so that the light is redirected outside of the height of the internal lens to the location outside of the vehicle.

20 Claims, 4 Drawing Sheets

LOW PROFILE LIGHT WITH AN OVERSIZED LIGHT EMISSION

FIELD

The present teachings relate to a light system having a low profile lens area with an effective light-emitting area that is larger than the lens area and is preferably equal or larger to a lit area that is larger than the lens area.

BACKGROUND

Vehicles include many different types of lights. Some types of lights included on a vehicle are low beam headlights, high beam headlights, tail lights, turn signal lights, fog lights, running lights, or a combination thereof. Each of these lights extend out of an outer surface of a vehicle so that they provide light for the driver or provide notice of surrounding drivers. Each of these lights require a space to function and provide light. However, having large lights, numerous lights, or both may be aesthetically unpleasing such that the lights may break up clean lines on an outside of a vehicle. Attempts have been made to provide antithetically pleasing vehicles with antithetically pleasing vehicle lights.

Thus, there is a need for a low profile light system where the light system appears to be smaller when the light is off then when the light is on. There is a need for a turn signal that is a same size as a high beam, but produces an area of light larger than the turn signal. There is a need for a system an area of light projected out from the turn signal is larger than a lens of the turn signal. It would be desirable to have a light system that has portions, which are optically not visible when the light system is off but are optically lightened when the light is turned on.

SUMMARY

The present teachings provide: a light system comprising: (a) one or more bezels; (b) an internal lens located within and in communication with the one or more bezels, wherein the internal lens has a height; and (c) a light source that directs light from the light system to a location outside of a vehicle that is configured to house the light system, wherein some of the light is directed to the location outside of the vehicle directly through the internal lens; wherein the one or more bezels include a reflector surface located outside of the height of the internal lens and some of the light from the light source is redirected by the internal lens to the reflector surface of the one or more bezels so that the light is redirected outside of the height of the internal lens to the location outside of the vehicle.

A light system comprising: a light system comprising: (a) a cap bezel including: (i) a recess and (ii) a reflector surface; (b) a base bezel; including: (i) a recess and (ii) a reflector surface; (c) an internal lens including: (i) an arm in communication with the recess of the cap bezel; (ii) an arm in communication with the recess of the base bezel; (iii) a face located between the arm in communication with the recess of the cap bezel and the arm in communication with the recess in the base bezel; and (iv) a height; (d) a printed circuit board extending between the cap bezel and the base bezel; (e) a light source connected to the printed circuit board that directs light from the light system to a location outside of a vehicle that is configured to house the light system, wherein some of the light is directed to the location outside of the vehicle directly through the face of the internal lens; and wherein the reflector surface of the cap bezel and the base bezel are located outside of the height of the internal lens and some of the light from the light source is redirected by the internal lens to the reflector surface of the cap bezel and the base bezel so that the light is redirected outside of the height of the internal lens to the location outside of the vehicle.

The present teachings provide a low profile light system where the light system appears to be smaller when the light is off then when the light is on. The present teachings provide a turn signal that is a same size as a high beam, but produces an area of light larger than the turn signal. The present teachings provide a system an area of light projected out from the turn signal is larger than a lens of the turn signal. The present teachings provide a light system that has portions, which are optically not visible when the light system is off but are optically lightened when the light is turned on.

DETAILED DESCRIPTION

Figure 1:
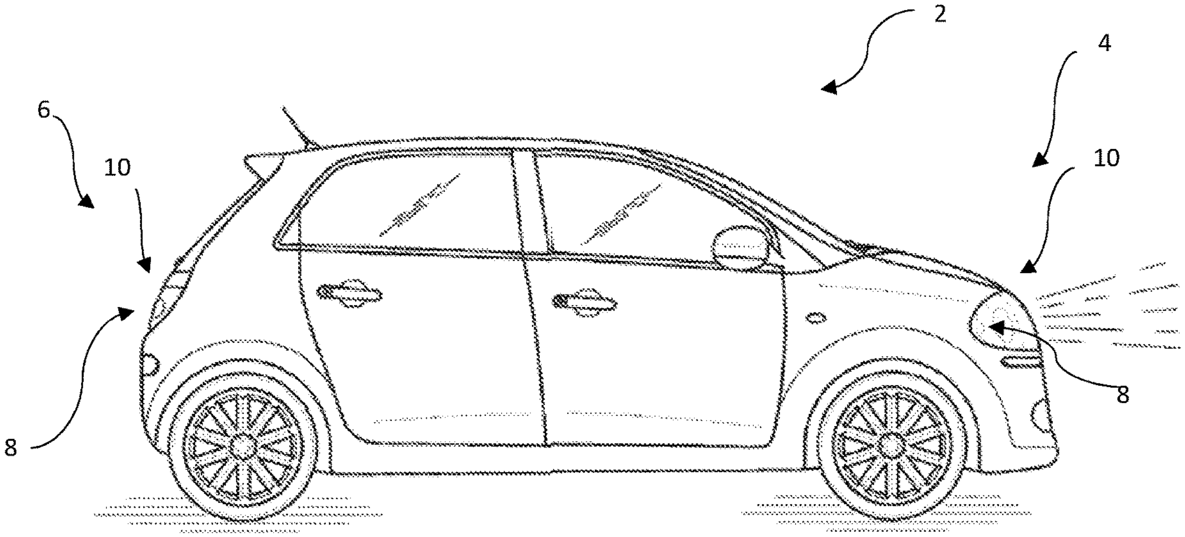
FIG. 1 is a side view of a vehicle including a front light system and a rear light system.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings relate to a light system. The light system is located within a vehicle. Preferably, the light system is part of a vehicle such as a car, motorcycle, bus, truck, semi-truck, SUV, XUV, four-wheeler, dirt bike, tractor, combine, heavy equipment, farm equipment, industrial equipment, commercial equipment, or a combination thereof. The light system may project in a forward direction, rear direction, side direction, or a combination thereof. Preferably, the light system projects a light from an external surface of the vehicle to a location in front of the vehicle or at an angle relative to the front or rear of a vehicle. The light system may direct some light at the ground. The light system may direct some light above the ground. The light system may be integrated into a front end, a rear end, or both of a car. The light system may be an assembly. The light system may be a sealed light system that is integrated into a vehicle. The light system may be a sub-assembly that is included in a larger light system. The light system may be integrated into another light system and may function to be part of the light system. The light system may project light out of the vehicle. The light systems may be multiple light systems stacked one above the other or integrated into a single light system. The light system may have multiple smaller light systems or may perform a plurality of light systems. The plurality of light systems may be located in one light system. The plurality of light systems may operate independently of one another such that one light system may not affect another light system or portion of the light system. The light of the vehicle may be two or more, three or more, or four or more light systems located one above another.

The light sources function to produce light. The light source may be a device or a plurality of devices that create light and the light extends outward from the light source. The light source may produce a high beam, a low beam, a blending beam, a running light, a day time light, a turn signal, a brake light, or a combination thereof. The light source may be aimed for near light, far light, blending light that blends the far light and near light together, or a combination thereof. The light sources may have different functions. For example, one light source may provide a running light and another light source may be a turn signal or fog light. The light source may comprise a plurality of lights or may be a single light source within a set of light sources. The plurality of lights may be in one set or group of light sources. The light source may be a single light that projects light. In another example, a single light source may direct light to a first location (e.g., a first light guide). The light source may be directional light. The light source may have an emission that is a Lambertian emission or a narrow emission angle. The directional light source may concentrate light on a light guide, towards a light bar, on a reflector, or a combination thereof. The light source may include a laser diode, glowing phosphor, filament bulb, a light emitting diode, a halogenated light, an xenon light, or a combination thereof. One light source may produce one light function.

The light source may be any type of lighting device that produces light such as an incandescent bulb, fluorescent light, compact fluorescent lamp, halogen lamp, light emitting diode (LED), high intensity discharge lamps (HID); halogen lights, xenon lights, a laser diode, phosphorous bulb, or a combination thereof. The light source may be a single lamp or bulb. Preferably, the light source is part of a set of light sources that includes a plurality of lamps, bulbs, diodes, or a combination thereof. The light source may be part of a set of light sources that includes two or more, 3 or more, 4 or more, or 5 more light sources that produce light and combine together to form the light extending from the light system. The sets of light sources may include 10 or less, 7 or less, 5 or less, or 3 or less devices that produce light (e.g., each set may include 5 light sources or alternatively all of the sets when combined together may include 5 light sources). For example, the set of light sources may be the contents of a single printed circuit board that perform a same lighting function and the set of light sources may be 5 light sources.

The printed circuit board may function to provide power, a signal, or both to the one or more light sources. The light source may be connected directly to the printed circuit board. The printed circuit board may have circuit mounted circuitry or through hole circuitry. The printed circuit board may be mounted and the mounting of the printed circuit board may aim the one or more light sources. The printed circuit board may be located within the light system, behind a bezel, behind a internal lens, adjacent to an internal reflector, or a combination thereof. The printed circuit board may carry a varying number of light sourced depending on the lighting function of the light system.

The number of light sources in a part of the light may dependent upon a size of the region or a size illuminated. For example, a brake light may have two or more light sources and a turn signal may have a single light. Thus, the light source may be one or more lights, two or more lights, or three or more lights. The light source may be static. The light sources may be free of movement. The light source may be fixed. The light sources may be static and may be manually or physically adjusted so that the light sources are directed to a desired location. The light sources may be fixed and the light from the light source may be moved, bent, directed, or a combination thereof by optical elements or reflectors (e.g., a light guide). Each device of the light source may be turned on and off. The light source may be located within a light system at a location relative to a light guide. Each light guide may receive light from a single light source. The light sources may work together as a set of light sources to create light.

The set of light sources function to fill a light bar, a lens, an outer housing, or a combination thereof with light so that the light bar, lens, outer housing, or a combination thereof projects light outward to perform some function. The set of light sources may be a single function (e.g., a high beam, a low beam, a blending beam, a running light, a day time light, a turn signal, a brake light, or a combination thereof). Each set of light sources may perform a single function. Preferably, some of the light systems may include two or more sets of light sources, three or more sets of light sources, or even four or more sets of light sources that provide two, three, or four functions respectively. Each of the sets of light sources may perform a different function or provide a different type of light. All of the lights within a set of light sources may provide the same light (e.g., color, color temperature, or wavelength). For example, one set of light sources may be yellow, orange, or red and a second set of light sources may be white (e.g., OEM white, off white, pure white, or crystal white (e.g., having a color temperature between 4300K and 6000K). The color, intensity, temperature, or a combination thereof may vary from set to set depending on the function of the set of light sources. For example, if one set of light sources is directed to a turn signal then the color may be orange whereas if the set of light sources is for a brake light then the color may be red. The light from the light system may be directed to a predetermined location depending on a function of the light from that set of light sources. For example, a running light may be directed outward in front of a vehicle whereas a turn signal may be directed at a 45 degree angle so that a portion of the light is visible in a front of the vehicle and a portion of the light is visible from a side of the vehicle.

Each of the set of light sources may direct light on a first side and a second side of an optical axis. Some of the light may extend on an inboard side of the optical axis (e.g., in a direction towards a center of a vehicle). Some of the light may extend on an outboard side of the optical axis (e.g., in a direction away from a center of a vehicle). The light may extend farther on an outboard side than an inboard side of a light. The light on the inboard side may illuminate a region between two light sources and in front of a vehicle. A right-handed light and a left-handed light may each include light that extends inboard (e.g., on an inboard side) so that the inboard lights overlap and illuminate in front of a vehicle. A right-handed light and a left-handed light may each include light that extends outboard (e.g., on an outboard side) of a vehicle so that the outboard light illuminates a region outside of the vehicle, sides of a road, or both. The light from each of the light sources may extend outward from the light source at an angle towards an inboard side and an outboard side. Each of the sets of light sources or functions of the light sources may be spaced apart by an axis. For example, a first function may extend along a first side of the axis and a second function may extend along a second side of the axis. An angle the light extends on an inboard side and an outboard side of the optical axis may be varied based on a shape of a reflector.

The directed light functions to extend out of the light system in a predetermined direction. The directed light may be directed to a road surface, above a road surface, parallel to a road surface, along a side, in a direction of motion, opposite a direction or motion, or a combination thereof of a vehicle. The directed light may be directed by a light bar, a reflector, or a combination of both. The directed light may extend at an angle so that the directed light is visible in two directions. For example a forward direction and a side direction. The directed light may be a turn signal. The directed light may extend from a light source into contact with an internal reflector and then through an internal lens.

The internal reflector functions to change a direction of light from a first direction to a second direction, to illuminate a predetermined region, lighten an internal lens, or a combination thereof. The internal reflector may be a curved material that redirects light from a light source in a direction as directed light. The internal reflector may be flat, concave, convex, curved, dished, or a combination thereof. The internal reflector may directly receive light from the light source. The internal reflector may be a polymer covered with reflective material. The internal reflector may be a polymer material covered with aluminum (e.g., polycarbonate). The internal reflector may be used with other reflectors, with light bars, redirecting textures, redirecting surfaces, or a combination of both. The internal reflector may direct light from the light source into contact with the internal lens. The internal reflector may direct light into contact with the face, redirecting texture, or both of the internal lens.

The one or more internal lenses function to direct the light from the reflectors to a location to be illuminated. The internal lenses may function to protect the light sources. The lenses may bend light. The internal lenses may refract light, redirect light, bend light, or a combination thereof. The internal lenses may diffuse the light, blend the light, spread the light, direct the light to a predetermined location, create one or more hot spots, direct light to a reflector surface, or a combination thereof. The internal lens may be located in front of the light emitting portion, in front of a light source, in front of an internal reflector, or a combination thereof. The internal lenses may cover all or a portion of the light system, the light source, light bars, or a combination thereof. Each light system may include an internal lens. The light system may include a single internal lens that covers each of the light bars that each provide or perform a different function. The internal lens may cover the light bar or reflector so that light, direct light, reflected light, or a combination thereof extends through the internal lens. The internal lens may be one or more internal lenses. The internal lens may be a plurality of internal lenses. The internal lens (e.g., primary lens or internal lens) may be a single internal lens. The one or more internal lenses may have a shape that directs light to a predetermined location. The one or more internal lenses may be flat, planar, bio-convex, plano-convex, positive meniscus, negative meniscus, plano-concave, bio-concave, double convex, converging, diverging, or a combination thereof. Each internal lens may be a single internal lens. Each internal lens may be a compound internal lens (e.g., there may be more than one lens). The internal lenses may have an area.

The area of the internal lenses may function to distribute visible light around a vehicle, provide a notice function, lighten an area surrounding the vehicle, or a combination thereof. The area may be a predetermined area. The area of the internal lenses may be predetermined by a function the light provides. The size of the internal lens may match a size of surrounding lights. The size of the internal lens may be equal to a size of an adjacent light that is different. For example, the internal lens may cover a turn signal and the internal lens height may match a height of a high beam light, a low beam light, or both. The height may be equal to or less than a height of an adjacent high beam, low beam, or both. A total area of the internal lens may be about 75 $cm^2$ or less, about 70 $cm^2$ or less, about 65 $cm^2$ or less, about 60 $cm^2$ or less, about 50 $cm^2$ or less, about 45 $cm^2$ or less. The total area of the internal lens may be about 25 $cm^2$ or more, about 30 $cm^2$ or more, or about 40 $cm^2$ or more. The internal lenses may have a height of about 2 $cm^2$ or more, about 3 $cm^2$ or more, about 4 $cm^2$ or more, about 5 $cm^2$ or more, or about 6 $cm^2$ or more. The internal lenses may have a height of about 12 $cm^2$ or less, about 10 $cm^2$ or less, about 8 $cm^2$ or less, or about 7 $cm^2$ or less. The internal lenses may have a length of about 5 $cm^2$ or more, about 6 $cm^2$ or more, about 7 $cm^2$ or more, about 8 $cm^2$ or more, or about 9 $cm^2$ or more. The internal lenses may have a height of about 20 $cm^2$ or less, about 17 $cm^2$ or less, about 15 $cm^2$ or less, or about 12 $cm^2$ or less. Each internal lens has a forward side and a rearward side.

The forward side, the rearward side, or both function to reflect the light, refract the light, spread the light, aim the light to a predetermined location, or a combination thereof. The forward side and the rearward side may be parallel to each other. The forward side and the rearward side may have a complementary shape. The forward side and the rearward side may have an angle relative to one another. For example, a forward surface may be planar and the rearward surface may be curved or angled. Conversely, the rearward surface may be planar and the forward surface may be curved. The shape of the forward surface, the rearward surface, or both may have a shape. The shape of the forward surface, the rearward surface, or both may be selected to determine where light is directed. The forward surface, the rearward surface, of both may cause light to diverge, converge, spread, create a hot spot, blend the light, or a combination thereof. The forward side, the rearward side, or both may be concave, convex, spherical, or a combination thereof to produce a shape such as bioconcave, bioconvex, plano-concave, plano-convex, meniscus, or a combination thereof. The forward side may be located proximate to a lens (e.g., an outer lens) of the light system. The forward side of the internal lens may be the forward side of the light emitting portion and may be covered by an outer lens. The forward side and the rearward side may include one or more different regions of the internal lens. The internal lens may include arms, faces, redirecting textures, or a combination thereof.

The one or more faces of the internal lens function to directly direct light outward away from the vehicle. The one or more faces may allow light to pass out of the one or more internal lenses in a direction substantially normal to the face, in a direction perpendicular to the face, directly through the face, or a combination thereof. The face may be substantially equal to a height of the internal lens discussed herein. The one or more faces may have a height and the height of the face may equal a height of visible light that extends through the internal lens. The face, internal lens, or both may be made of a clear material, a colored material, a textured material, or a combination thereof. The face may provide controlled light to a region outside of the vehicle that may be visible outside of the vehicle. The face may provide a primary height and length of light that is visible. The face may include one or more redirecting textures therearound.

The redirecting textures may provide light to an area outside of the internal lenses. The redirecting textures may provide a secondary light. The redirecting textures may provide light from the internal lens to a reflector surface. The redirecting textures may refract light towards and into contact with the reflector surfaces of the one or more bezels. The redirecting textures may provide controlled light, semi-controlled light, redirected light, reflected light, or a combination thereof. The redirecting textures may provide some light directly outward within an area of the internal lens. The redirecting textures may be angled portions of the internal lenses. The redirecting textures may provide some light at an angle relative to the light that extends through the face. The redirecting textures may provide light at an angle of about 15 degrees or more, about 30 degrees or more, about 45 degrees or more, about 60 degrees or more, or about 75 degrees or more relative to the light extending through the face. The redirecting textures may provide light at an angle of about 90 degrees or less, about 80 degrees or less, about 70 degrees or less, or about 60 degrees or less relative to the light extending through the face. The redirecting textures may extends at an angle relative to the lens from about 15 degrees to about 75 degrees.

The redirecting texture may be a texture or pattern added to an inside or outside of the internal lens. The redirecting texture may be integrally formed into the internal lens during formation of the internal lens. The redirecting texture may be a monolithic part of the internal lens. The redirecting texture may be added after the internal lens is formed. Light may pass directly through the redirecting texture. Some light may be reflected by the redirecting texture. The redirecting texture may provide a Fresnel reflection. The redirecting texture may be one or more angles or shapes formed into the internal lens. The redirecting texture may form an angle relative to the face. The redirecting texture may be a shape formed in a region proximate to the face. For example, the redirecting texture may be located above, below, on a first side, on a second side, or a combination thereof of the face. The redirecting texture may be concave, convex, flat, plano convex, plano concave, bi-convex, bi-concave, positive meniscus, negative meniscus, or a combination thereof. The redirecting lens may be a chamfer. The redirecting lens may include surface shapes such as lines, pyramids, semi-circles, cones, cubes, cylinders, triangular prisms, square pyramids, pentagonal prims, tetrahedrons, a corner reflector, a flat reflector, a parabolic reflector, a spray on reflective texture, a molded in reflector, or a combination thereof. The redirecting texture may form one or more breaks or bends in the internal lens (e.g., a physical change in direction).

Each of the changes in direction of each the redirecting textures may be an angle of about 15 degrees or more, about 25 degrees or more, about 35 degrees or more, about 40 degrees or more, about 45 degrees or more, or about 50 degrees or more. Each of the changes in direction of each the redirecting textures may be an angle of about 90 degrees or less, about 80 degrees or less, about 75 degrees or less, about 70 degrees or less, about 65 degrees or less, or about 60 degrees or less. The internal lens may include one or more, two or more, three or more, four or more, or five or more changes in direction. The internal lenses may include seven or less, six or less, or five or less changes in direction (e.g., 2 changes in direction above the face and two changes in direction below the face). The changes in direction when added together may total 90 degrees or less. The changes in direction may equal the amount of redirection the light experiences. The changes in direction may connect the face to an upper arm and the face to lower arm. The changes in direction may direct light from a light source to one or more reflector surfaces. The changes in direction may direct light from the light source to a reflector surface above the face, a reflector surface below the face, or both. The changes in direction of the redirecting texture may connect the face to the arms so that the internal lens is connected to one or more bezels.

The arms function to connect the internal lens to one or more bezels or two or more bezels. The arms of the internal lens may be in communication with the one or more bezels. The arms may extend into a bezel or vice versa. The arms may be a projection that extends into a recess of a bezel. The arms may be a recess that receives a portion of the bezel. The arms may project outward from the face to connect the internal lens within the light system. The arms may extend substantially parallel to the face. The arms may extend into a bezel. The arms may extend from a top, bottom, first side, second side, or a combination thereof. The arms may only extend from a top or a bottom. The arms may extend into and lock within a recess of a bezel.

The bezel functions to connect the internal lens into a light system. The bezel may function to reflect light that extends through the internal lens to a location outside of the light system, the vehicle, or both. The bezel may be hidden from view when the light system is off. The bezel may be a single bezel that extends above and below. The bezels may have a "C" shape that connects to a top and a bottom of the internal lens. The bezels may connect to a first side and a second side (e.g., a left side and a right side). The bezels may connect to a first edge and a second edge and then extend above and below the internal lenses. The bezels may be two parts. The bezels may be a cap bezel and a base bezel.

The cap bezel may extend above the internal lens. The base bezel may extend below the internal lens. The cap bezel and the base bezel may be connected together. The cap bezel and the base bezel may be connected by one or more fasteners that connect the cap bezel and base bezel together. The cap bezel and the base bezel may have monolithic fasteners that connect the two together. The cap bezel and the base bezel may have a projection and recess that connect the cap bezel and the base bezel together. The cap bezel and the base bezel may be separate pieces, a single piece, or both. The cap bezel and the base bezel may each include one or more recesses, one or more reflector surfaces, or both.

The one or more recesses function to receive one or more arms, connect the arms within the light system, create a friction fit to connect the internal lens, or a combination thereof. The one or more recesses may be a channel that an arm extends into. The recesses may form a friction fit, press fit, snap fit, or a combination thereof. The recess may form a sliding connection with the arms. One recess may receive one arm. Each bezel may include one or more recesses or two or more recesses that are curved so that the arms can fit with the contour of the bezel, the internal lens, or both. The recesses may be "U" shaped, "C" shaped, "L" shaped, or a combination thereof. The recesses may be part of the bezel, the internal lens, or a combination of both. The bezel, the internal lens, or both may include a partial arm and a partial recess. For example, the bezel and the internal lens may have alternating arms and recesses. The recesses may be located behind a reflector surface so that the connection between the internal lens and the bezel are hidden.

The reflector surface functions to reflect light outward, indirectly provide light, reflect light outward from a vehicle, redirect light to a location outside of the vehicle or light system, or a combination thereof. The reflector surface may be located outside of the internal lens. The reflector surface may be located above, below, on a first side, on a second side, or a combination thereof of the internal lens. The reflector surface may extend parallel to the internal lens. The reflector surface may frame the internal lens. The reflector surfaces may be located outside of a height, width, or both of the internal lenses. The reflector surfaces may extend around one or more sides, two or more sides, three or more sides, or four or more sides of the internal lens. When more than one reflector surface is present the reflector surfaces may be identical in size and shape. The two or more reflector surfaces may differ in size and shape.

All or a portion of the reflector surfaces may be flat, arcuate, curved, “C” shaped, “U” shaped, “V” shaped, generally parabolic, partially parabolic, angled towards the internal lens, angled away from the internal lens, angled up, angled down, concave, convex, or a combination thereof. The reflector surfaces may include a reflective material (e.g., aluminum, silver, a metal). The reflector surfaces may be free of any added reflective material. The reflector surfaces may be free of any added material. The reflector surfaces may be polished. The reflector surfaces may be glossy, flat, or both. The reflector surfaces may be made of a dark color. The reflector surfaces may be black. The reflector surfaces, the bezel, or both may be made of or include a polymer. The reflector surfaces, the bezel, or both may be made of or include a polycarbonate (PC), acrylic, polypropylene (PP), acrylonitrile butadiene styrene (ABS), poly(methyl methacrylate (PMMA), or a combination thereof. The reflector surfaces may be obscured from view or not visible when the light source is off but may be visible when the light source is on. The reflector surfaces may direct light outward so that the reflector surfaces add to a total area of light visible. The reflector surfaces may expand an area of visible light beyond the internal lens so that an amount of light visible is larger in area than the internal lens. The reflector surface may be sufficiently reflective to reflect light that is visible (e.g., a luminous intensity of about 160 cd/m$^2$ or more). The reflector may reflect light so that an intensity of the light is about 160 cd/m$^2$ or more, about 170 cd/m$^2$ or more, about 180 cd/m$^2$ or more, about 190 cd/m$^2$ or more, or about 200 cd/m$^2$ or more. The reflector surfaces may be angled towards the redirecting textures so that light from the redirecting textures contacts the reflector surfaces and is angled outward away from the reflector surfaces. The reflective surfaces may be positioned by one or more brackets connecting with in the light system and aiming the one or more reflective surfaces relative to the internal lenses.

The brackets function to connect the bezels to a frame, a housing, a portion of the light system, or a combination thereof. The brackets function to aim the reflector surfaces, the internal lenses, or both. The brackets may maintain a position of the bezels within the light system. The brackets may connect via a fastener, an integral fastener, a locking member, or a combination thereof. The brackets may be located behind a lens, behind a reflector surface, behind an outer lens, or a combination thereof.

The outer lens or lens may function to protect the light system, house all of the internal components, or both. The lens (e.g., outer lens) may be an outer most part of a light system. The lens may receive all of the light from the lens to be directed outward from the vehicle, in a direction of movement of a vehicle or, both. The lens may be sufficiently strong to protect the light system from rocks and debris as the vehicle moves. The lens may cover all of the light sources, all of the light bars, all of the light sources, or a combination thereof of the light system (e.g., a first light bar, a second light bar, or a third light bar). The lens may be transparent so that light may extend through the outer lens. The outer lens may obscure the one or more reflector surfaces when the light source is off. For example, when the light sources are off the reflector surfaces may seem like a void behind the outer lens such that they are not readily visible.

FIG. 1 illustrates a side view of a vehicle 2 including light systems 10. The light systems 10 are located at the front end 4 and the rear end 6. The light system 10 at the front end 4 and the rear end 6 each include a turn signal 8.

Figure 2:
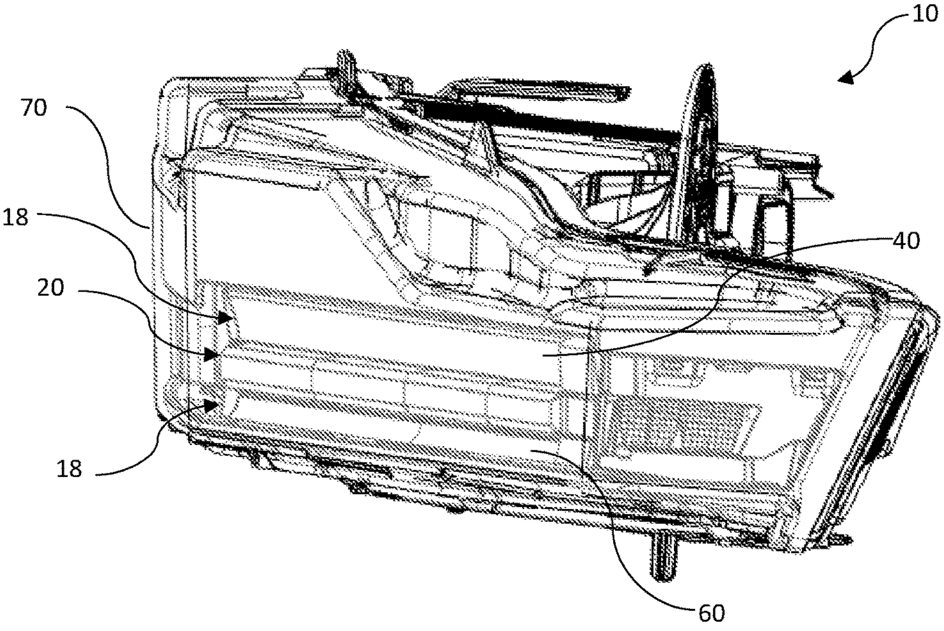
FIG. 2 is an isometric view of a light system.

FIG. 2 is a front isometric view of a light system 10. The light system 10 includes bezels 18 around an internal lens 20. The bezels 18 as shown are separate and include a cap bezel 40 and a base bezel 60. The bezels 18 and internal lens 20 are covered by an outer lens 70 that forms an outer most part of the light system 10.

Figure 3:
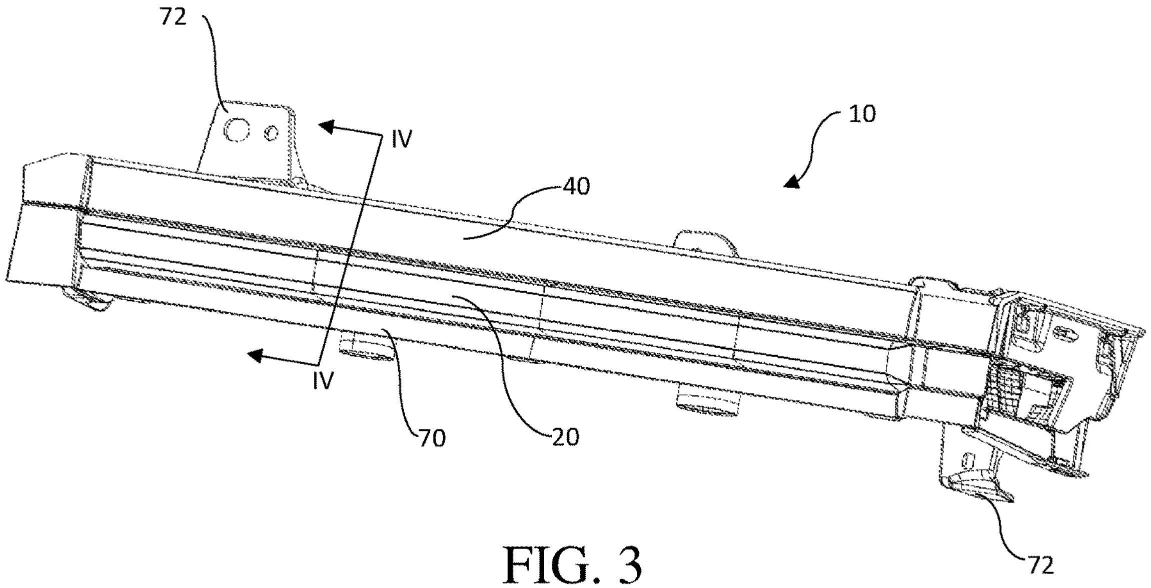
FIG. 3 is an isometric view of one function of the light system.

FIG. 3 is a front isometric view of the internal lens 20, cap bezel 40, and base bezel 60 of the light system 10 removed from a vehicle (not shown). The cap bezel 40 and base bezel 60 each include a bracket 72 to connect with the light system 10.

Figure 4:
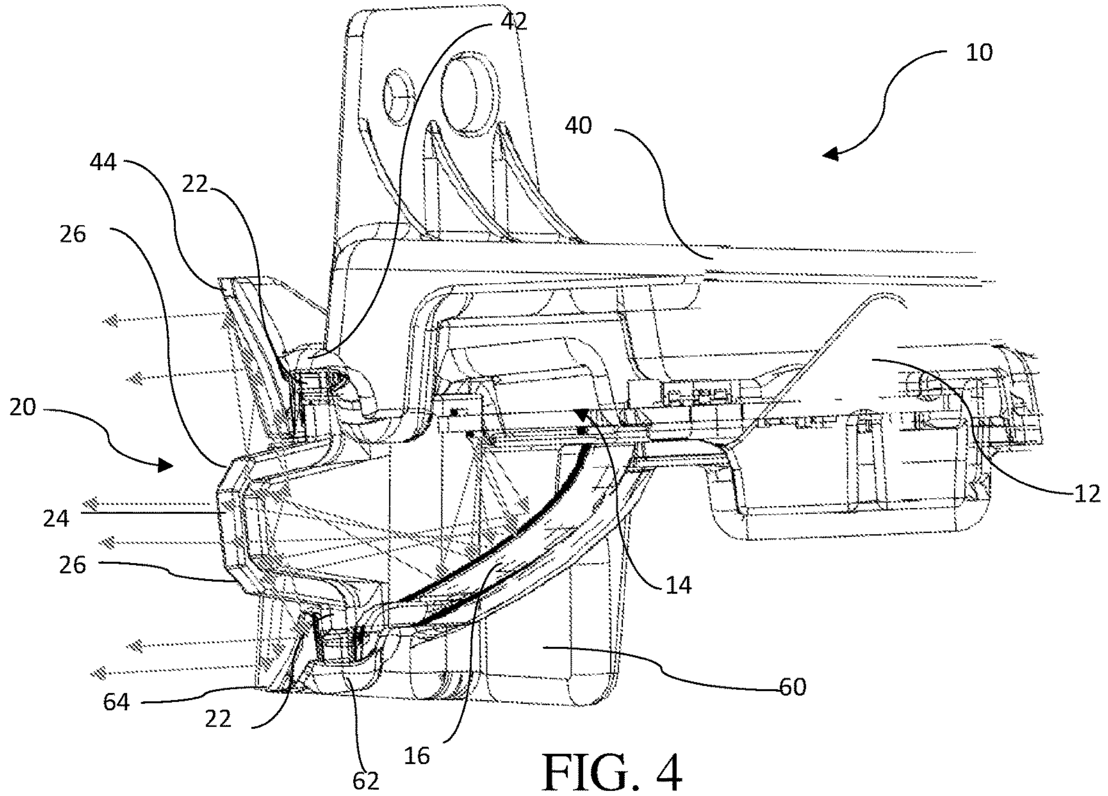
FIG. 4 is a partial cross-sectional view of a light system of FIG. 3 along line IV-IV.

FIG. 4 illustrates a cross-sectional view of a light system 10 of FIG. 3 along line IV-IV. The light system 10 includes an internal lens 20 located between and connected to a cap bezel 40 and a base bezel 60 by one arm 22 of the internal lens 20 extending into a recess 42 in the cap bezel 40 and a second arm 22 extending into a recess 62 of the base bezel 60. A printed circuit board 12 including a light source 14 is located between the cap bezel 40 and the base bezel 60. The light source 14 directs light away from the printed circuit board 12 towards an internal reflector 16 on the base bezel 60. Some of the light extends from the internal reflector 16 through a face 24 of the internal lens 20 in an outward direction. Some of the light extends from the internal reflector 16 through redirecting textures 26 of the internal lens 20 at an angle. Some of the light from the redirecting textures 26 contacts a reflector surface 44 so that the light is directed in an outward direction. Some of the light from the redirecting textures 26 contacts a reflector surface 64 of the base bezel 60 so that the light is directed in an outward direction. The outward directions of the internal face, the cap bezel 40, and the base bezel 60 are all substantially parallel to one another and project light in an area larger than an area of the internal lens 20. Some of the light that contacts the redirecting textures 26 is reflected back via a Fresnel reflection so that the reflected light diffuses through the internal lens 20 into contact with the reflector surfaces 44 and/or 64.

Figure 5:
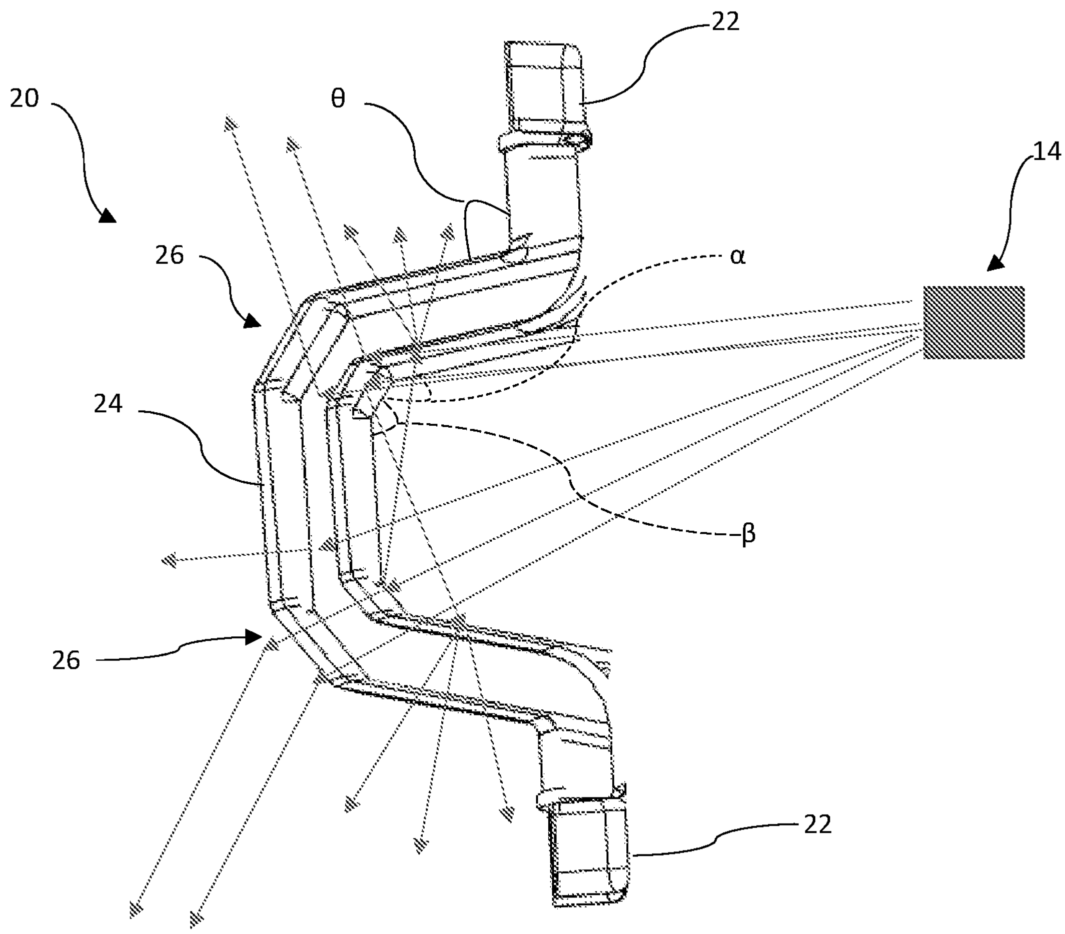
FIG. 5 is a close-up cross-sectional view of a lens.

FIG. 5 is a cross-sectional view of an internal lens 20. The internal lens 20 includes opposing arms 22 with a face 24 located between the arms 22. The face 24 and arms 22 are connected opposing redirecting textures 26. As show, a light source 14 directs light directly towards the internal lens 20; however, the light may be indirectly provided via a reflector as is shown in FIG. 4. The face 24 of the internal lens 20 directs light substantially outward away from the internal lens 20. The redirecting textures 26 are configured to redirect the light in an angle different than the light from the face 24. The redirecting textures 26 may be a coating on the internal lens 20 or may be one or more angles formed in the internal lens 20. As shown, the internal lens 20 at the redirecting texture 26 forms a first angle ($\alpha$) proximate to the arms 22 and a second angle ($\beta$) proximate to the face 24 such that the light from the light source 14 is directed at a different angle as the light extends through the redirecting texture 26 than the light that extends through the face 24. The first angle ($\alpha$) and the second angle ($\beta$) of each of the redirecting textures 26 may be identical. The face 24 extends at an angle ($\theta$) relative to the arms 22. Some light may extend directly through the redirecting textures 26. Some light may be reflected back by the redirecting texture as the redirecting texture may provide a Fresnel reflection.

Figure 6:
FIG. 6 is a front view of the light system.

FIG. 6 is a front view of a single bezel 18 housing the internal lens 20. As shown, the internal lens 20 has a height ($H_1$) and the bezel 18 includes a height above ($H_2$) and a height below ($H_3$) the internal lens 20.

Figure 7:
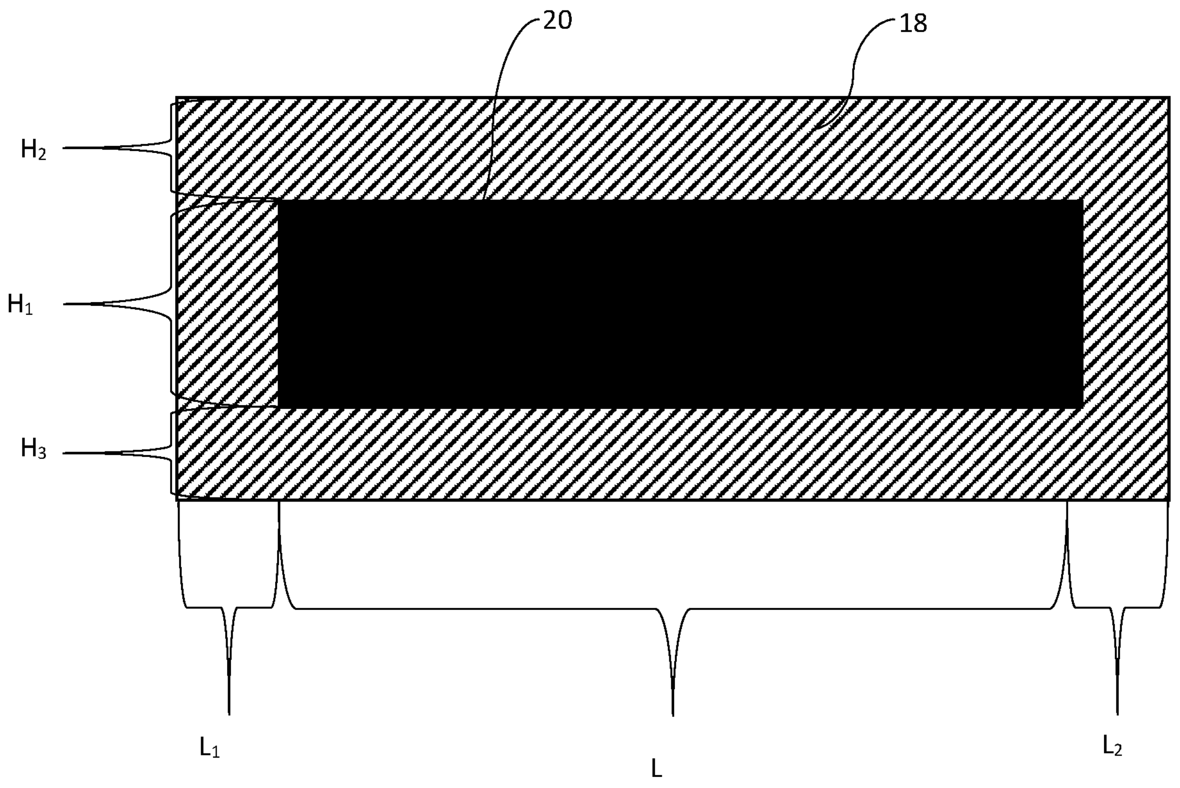
FIG. 7 is a front view of the light system.

FIG. 7 is a bezel 18 forming a frame around the internal lens 20. As shown the internal lens 20 has a height ($H_1$) and the bezel 18 includes a height above ($H_2$) and a height below ($H_3$) the internal lens 20. The internal lens 20 has a length (L) and the bezel 18 includes lengths ($L_1$) and ($L_2$) on opposing ends of the internal lens 20.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of or even consists of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

ELEMENT LIST

2 Vehicle
4 Front End
6 Rear End
8 Turn Signal
10 Light System
12 Printed Circuit board
14 Light Source
16 Internal Reflector
18 Bezel
20 Internal Lens
22 Arms
24 Face
26 Redirecting texture
40 Cap Bezel
42 Recess
44 Reflector Surface
60 Base Bezel
62 Recess
64 Reflector Surface
70 Outer Lens
72 Bracket

We claim:

1. A light system comprising:

a. one or more bezels;

b. an internal lens located in communication with the one or more bezels, wherein the internal lens has a face with a height; and c. a light source that directs light from the light system to a location outside of a vehicle that is configured to house the light system, wherein some of the light is directed to the location outside of the vehicle directly through the face of the internal lens;

wherein the one or more bezels include a reflector surface located outside of the height of the face of the internal lens and some of the light from the light source is redirected by the internal lens to the reflector surface of the one or more bezels; and wherein the light that is redirected extends from the light source, through the internal lens, into contact with the reflector surface on the one or more bezels, and then the light is redirected a second time from the reflector surface through a region of the light system located outside of the height of the face of the internal lens to the location outside of the vehicle.

2. The light system of claim 1, wherein the one or more bezels are a cap bezel and a base bezel and both the cap bezel and the base bezel include the reflector surface.

3. The light system of claim 1, wherein the height of the face of the internal lens is equal to or less than a height of an adjacent high beam, low beam, or both.

4. The light system of claim 3, wherein the height of the internal lens is about 15 cm or less.

5. The light system of claim 1, wherein the reflector surface of the one or more bezels are generally flat.

6. The light system of claim 1, wherein the reflector surface of the one or more bezels are partially parabolic or generally curved.

7. The light system of claim 1, wherein the reflector surfaces of the one or more bezels are free of added reflective material.

8. The light system of claim 1, wherein the reflector surface of the one or more bezels are sufficiently reflective so that a luminous intensity of light reflected from the reflector surface is about 160 $cd/m^2$ or more.

9. The light system of claim 1, wherein an area of the internal lens is less than 75 $cm^2$.

10. The light system of claim 1, wherein the reflector surface of the one or more bezels are a polycarbonate (PC), acrylic, polypropylene (PP), acrylonitrile butadiene styrene (ABS), poly(methyl methacrylate (PMMA), or a combination thereof and the reflector surface of the one or more bezels are a polished to create a surface that reflects the light.

11. The light system of claim 1, further comprising a redirecting texture in or on the internal lens that redirects the light from the light source to the reflector surface of the one or more bezels.

12. The light system of claim 11, wherein the redirecting texture is an angled portion of the internal lens that refracts the light outside of the height of the internal lens towards and into contact with the reflector surface of the one or more bezels.

13. The light system of claim 12, wherein the angled portion has an angle, and the angled portion extends from the face of the internal lens at about 15 degrees to about 75 degrees.

14. The light system of claim 11, wherein the redirecting texture is made of or includes a corner reflector, a prism reflector, a flat reflector, a parabolic reflector, a spray on reflective texture, a molded in reflector, or a combination thereof.

15. The light system of claim 1, wherein reflector surfaces are obscured from view or not visible when the light source is off but are visible when the light source is on.

16. A light system comprising:

a. a cap bezel including:
   i. a recess and
   ii. a reflector surface;
b. a base bezel; including:
   i. a recess and
   ii. a reflector surface;
c. an internal lens including:
   i. an arm in communication with the recess of the cap bezel;
   ii. an arm in communication with the recess of the base bezel;
   iii. a face located between the arm in communication with the recess of the cap bezel and the arm in communication with the recess in the base bezel; and
   iv. a height;
d. a printed circuit board extending between the cap bezel and the base bezel;
e. a light source connected to the printed circuit board that directs light from the light system to a location outside of a vehicle that is configured to house the light system, wherein some of the light is directed to the location outside of the vehicle directly through the face of the internal lens;

wherein the reflector surface of the cap bezel and the base bezel are located outside of the height of the internal lens and some of the light from the light source is redirected by the internal lens to the reflector surface of the cap bezel and the base bezel so that the light is redirected outside of the height of the internal lens to the location outside of the vehicle.

17. The light system of claim 16, wherein a height of the light from the cap bezel, the base bezel, and the internal lens is greater than the height of the internal lens.

18. The light system of claim 16, wherein the face is located between a first redirecting texture and a second redirecting texture.

19. The light system of claim 18, wherein the redirecting texture is an angled portion of the internal lens that refracts the light towards and into contact with the reflector surface of the cap bezel and the base bezel.

20. The light system of claim 16, wherein the reflector surfaces of the cap bezel and the base bezel are sufficiently reflective so that a luminous intensity of light reflected from the reflector surfaces is about 160 $cd/m^2$ or more.

* * * * *